(No Model.)

G. ANDERSON.
PLANT PROTECTOR.

No. 327,510. Patented Oct. 6, 1885.

WITNESSES:
Edward Wolff
Robt. H. Roy

INVENTOR
George Anderson
BY
Frank v. Briesen
ATTORNEY

N. PETERS, Photo-Lithographer, Washington, D. C.

UNITED STATES PATENT OFFICE.

GEORGE ANDERSON, OF NEW YORK, N. Y.

PLANT-PROTECTOR.

SPECIFICATION forming part of Letters Patent No. 327,510, dated October 6, 1885.

Application filed September 29, 1884. Serial No. 144,214. (No model.)

*To all whom it may concern:*

Be it known that I, GEORGE ANDERSON, of the city of New York, in the county and State of New York, have invented a new and Improved Plant-Protector, of which the following specification is a full, clear, and exact description.

This invention relates to a guard adapted to be placed around a plant in order to protect the same from the sun, insects, and light frosts.

The invention consists, principally, in a shell, which is open at top and bottom, and adapted to be placed around a plant; also, in the various features of improvement hereinafter more fully pointed out.

Figure 1:
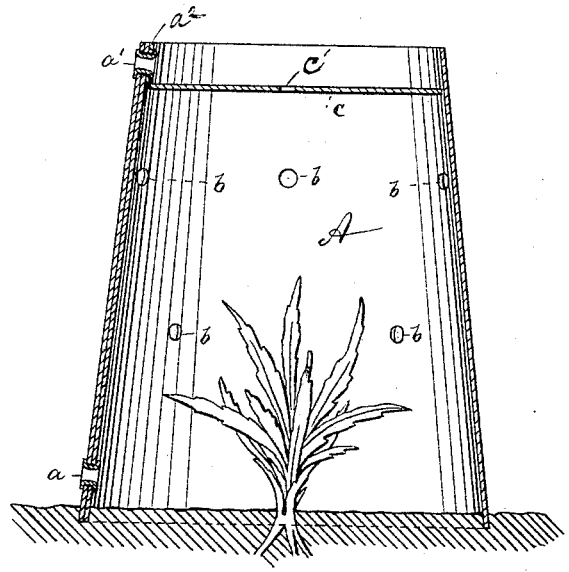
Figure 2:
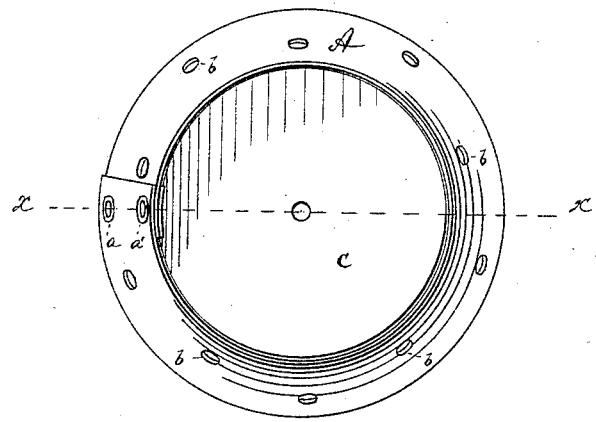

In the accompanying drawings, Figure 1 is a vertical central section of my improved plant-protector on the line $x\ x$, Fig. 2. Fig. 2 is a top view of the same.

The letter A represents the body or shell of my protector. It is composed of a piece of pasteboard or equivalent material bent into the form of a frustated cone open at top and bottom. The upright edges of the shell A overlap, and are joined by eyelets $a\ a'$, or in equivalent manner.

$b\ b$ are a number of perforations through the shell A, arranged, preferably, in two rows in such a way that the perforations in one row are between those in the other row, as seen in Fig. 1.

$c$ is a paper cover hinged to the upper part of the shell A and attached, preferably, by the same eyelet, $a'$, which connects the edges of shell A. In this way a simple and inexpensive guard is formed.

As the cover $c$ is within the upper part of the shell A, it is protected thereby. It is provided with one or more perforations, $c'$, for the same purpose as apertures $b$. The eyelet $a'$ affords a permanent attachment and hinge for said cover, the said eyelet passing through an upwardly-bent lip, $a^2$, of the latter, as well as through shell A.

In order to prevent insects from crawling up the protector, I immerse the same into or coat it with a composition formed of one part of carbolic acid and sixteen parts of coal-oil. This composition also serves to make the protector slightly translucent, so as to transmit a mellow light, and, moreover, preserves it from rapid decay.

In use, my protector is placed around a garden or field plant to be protected, and its lower edge is forced into the ground. If the cover $c$ is closed, air has access only through apertures $b$, and the plant is protected from the direct rays of the sun and from the wind. By opening the cover $c$ more or less the amount of direct light admitted may be regulated.

I claim as my invention—

A plant-protector consisting of the perforated shell A and the cover $c$, the latter being located within the shell, near the upper end thereof, and provided with a raised lip, $a^2$, and an eyelet, $a'$, for hinging said cover to said body, substantially as set forth.

GEORGE ANDERSON.

Witnesses:
F. V. BRIESEN,
ROBERT H. ROY.